United States Patent [19]

Clough

[11] 4,028,414

[45] June 7, 1977

[54] PROCESS, PRODUCTS AND COMPOSITION

[75] Inventor: Thomas J. Clough, Glenwood, Ill.

[73] Assignee: Atlantic Richfield Company, Philadelphia, Pa.

[22] Filed: Oct. 28, 1975

[21] Appl. No.: 625,977

Related U.S. Application Data

[60] Continuation of Ser. No. 804,037, Jan. 2, 1969, abandoned, which is a division of Ser. No. 631,163, April 17, 1967, Pat. No. 3,479,291.

[52] U.S. Cl. ............................................ 260/566 R
[51] Int. Cl.² .................................... C07C 119/00
[58] Field of Search ............................. 260/566 R

[56] References Cited

UNITED STATES PATENTS

| 2,095,814 | 10/1937 | Hopff et al. | 260/566 |
| 2,652,367 | 9/1953 | Adelson | 260/566 |

*Primary Examiner*—Gerald A. Schwartz
*Attorney, Agent, or Firm*—Thomas J. Clough

[57] ABSTRACT

Alpha-monoalkenes are addition polymerized by using an acyl halide (e.g., acetyl chloride) — Friedel Crafts catalyst complex and a monochloroalkane solvent (e.g., ethyl chloride); the acyl halide reacts in situ with the monomer to yield a polymeric ketone. The polymeric ketone is subsequently reacted with an aliphatic polyamine (e.g., tetraethylenepentamine) to yield a condensation product which is useful as a lube oil detergent.

15 Claims, No Drawings

PROCESS, PRODUCTS AND COMPOSITION

This is a continuation, of application Ser. No. 804,037, filed Jan. 2, 1969, now abandoned, which is a divisional of Ser. No. 631,163, filed Apr. 17, 1967, now U.S. Pat. No. 3,479,291.

This invention relates to novel polymeric ketones, to their method of preparation, and to the reaction products thereof with polyamines. The invention also concerns lubricating oils which contain these polymeric ketone-polyamine condensation reaction products.

Today many passenger cars primarily are used for driving to and from work, for errands, and for other short trips. This type of driving requires many stops and does not provide for full warmup or utilization of the automobile. Engines are so lightly loaded and operated so intermittently that rarely do they get warm enough to operate efficiently. The fuel used in this type of engine is, of course, gasoline, usually considered an easily-burned fuel. Gasoline is easily burned if engine combustion chambers reach a high enough temperature and the fuel therein is properly vaporized and mixed with adequate oxygen. In such combustion the gasoline is completely burned and only harmless carbon dioxide gas and steam are formed. However, if the engine does not operate long enough to heat its jacket water and crankcase to at least 150° F., some carbon dioxide and steam will blow by piston rings, condense in the cold crankcase and form liquid carbonic acid which rusts iron and steel.

Thus, when the engine is cold and operated at the low speeds characteristic of "short trip" driving, combustion is insufficient and incomplete. Under these conditions the gasoline is only partially burned, and much carbon, carbon monoxide gas, partially-oxidized fuel, and highly corrosive fuel acids are formed in the combustion chambers (in addition to the normal carbon dioxide gas and water) and blow by piston rings to foul the crankcase oil. The material resulting from incomplete combustion of gasoline causes numerous engine difficulties and sometimes expensive damage when collected in the crankcase. Examples of the damage that results are seized and battered hydraulic valve lifters, worn cam lobes, stuck piston rings, high piston ring and cylinder wear with consequent high oil consumption and oil contamination, corroded bearings, scuffed pistons, clogged oil pump screens, which may lead to engine oil starvation, burned out bearings, and piston seizures. A modern lubricant must therefore prevent deposition of solid products on the surfaces of the engine which normally come in contact with the lubricant.

Another source of trouble from deposits in internal combustion engines is the additives which are conventionally incorporated in lubricants. This is particularly the case with metal-containing additives, for example, the organic, metal-containing salts which are incorporated in the oil to increase the detergency thereof. Whenever oil is burned in the engine (as occurs with the oil film on the cylinder wall during the combustion stroke) any metal-containing additives in the oil may form an ash which is partially deposited on the various surfaces of the combustion chambers, spark plugs and valves. Accordingly, it is an object of this invention to provide a lubricant composition which can be free of metal-containing detergents.

Still the major donor of engine deposits is the incompletely combusted fuel, particularly the metal additives contained in the fuel. The ashless detergents of this invention provide for inhibition of sludge formation in the engine and, further, dispersion of the sludge when formed. For many years, the detergent additives successfully employed on a commercial scale have been organic, metal-containing compounds such as calcium petroleum sulfonate, calcium cetyl phosphate, calcium octyl salicylate, calcium phenyl stearate or the potassium salt of the reaction product of phosphorous pentasulfide and polybutene. Various of these detergents act by reacting chemically with precursors to form harmless compounds. Others act to prevent flocculation or coagulation of solid particles in the oil and maintain the same in a state of suspension as finely-divided particles. Still, others not only perform this dispersant function but also effect the solubilization or emulsification of the sparingly soluble monomers in the oil and thereby greatly reduce the rate of polymerization. In the latter case, such polymer materials as do form within the body of the oil are smaller in size and can be peptized or dispersed in the oil much more readily than is the case with the large polymeric particles which are formed on exposed engine surfaces or in droplets lying within the oil. Detergents capable of performing the dispersant function, as well as the solubilization or emulsification, are preferably employed wherever possible, particularly in automotive engines to be operated under city driving conditions. Although these metal-containing, organic compounds have effectiveness as detergents for dispersing these deposit precursors, they have the disadvantage of forming ash deposits in the engine.

To circumvent the problems of metal-containing organic detergents, non-metallic detergents were developed. Sulfurized and phosphosulfurized long chain hydrocarbons have detergent properties; however, these detergents evolve hydrogen sulfide on heating and also have 0.1 to 0.2% ash. Macromolecular compounds, mostly phenolics and phenolic resins, have been observed to have some detergent activity. Acrylate polymers have also been employed, and a fraction of the carboxyl function thereof has been esterified with long chain oleophilic alcohols and the remainder esterified with hydrophilic polyglycol ethers, or amidified or neutralized with amines. Many non-metallic detergents suffer the liability of low basicity and therefore cannot effectively counter the baneful effects of sulfuric acid produced in situ in the oil. In an effort to increase the basicity of the detergents, the art has investigated polyamine salts and amides as possible detergents; several patents have been issued, e.g. U.S. Pat. No. 3,018,247 to Anderson et al., which disclose such detergents, e.g., the N-polyamine substituted monoalkenyl succinimides.

It has now been found that a normally liquid, mineral lubricating oil-soluble, polymeric ketone composed essentially of polymerized alpha-olefin having from 3 to about 30, preferably about 9 to 21 and often at least about 12, carbon atoms, the polymerization of which is initiated using a complex of a Friedel-Crafts catalyst and an acyl halide having from 2 to about 20 carbon atoms, preferably 2 to about 10 carbon atoms, in a monochloroalkane solvent, can be reacted with organic amines to give a mineral lubricating oil-soluble, condensation reaction product which is effective as an ashless detergent. The alpha-olefin may be the only monomer polymerized, and in any event this olefin comprises the major portion of the monomers, or there may be employed, if desired, a minor portion, for instance, about 5 to 45 mole percent, preferably about 15 to 40 mole percent, based on total monomer, of another, dissimilar, olefinically unsaturated copolymerizable monomer having from about 3 to 25 carbon atoms, preferably about 4 to 18 carbon atoms. Accordingly, the alpha-olefin often provides about 55 to 95 or even 100 mole percent, preferably about 60 to 85 mole percent, of the monomers polymerized.

The alpha-olefins, or alpha-monoalkenes, of the present invention include those of the formula:

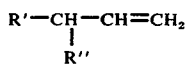

wherein R' and R" are selected from the group consisting of hydrogen and alkyl, including cycloalkyl, and the total number of carbon atoms in the alpha-olefin is from 3 to about 30, preferably about 9 to 21. Preferably, one of R' and R" is hydrogen and the other is a straight chain alkyl to give a normal olefin. The choice of α-olefin, their ratios, if more than one be employed, and the extent of reaction are such as to give an oil-soluble polymer, and often the total number of carbon atoms in the olefin reactant is at least about 12. The alpha-olefin can also contain minor amounts, preferably less than about 10% by weight, of other non-polymerizable hydrocarbons such as saturated hydrocarbons and aromatics.

As noted above, the alpha-olefin may be polymerized with another olefinically-unsaturated monomer which is dissimilar to or different from the alpha-olefin. By dissimilar I mean falling outside the definition of the class of α-monoalkenes described herein. Representative other monomers include hydrocarbons such as styrene, vinyl cyclohexene, vinyl toluene, indene, butadiene, etc., and other unsaturated materials as, for instance, linoleic acid, methyl oleate, methyl methacrylate, acrylonitrile, etc. The major requirement of said dissimilar monomer is that it be copolymerizable with the said alpha-olefin.

An acyl halide-Friedel Crafts catalyst complex is employed to initiate the polymerization of the essentially alpha-olefin monomer, the acyl halide entering into reaction with the monomer to produce a polymeric ketone. Typical of the acyl halides which can be used are the acid halides having from 2 to about 20, preferably from 2 to about 10 carbon atoms, such as the alkyl acylhalides, e.g., acetyl chloride acetyl fluoride, acetyl bromide, acetyl iodide, chloro-acetyl chloride propionyl chloride n-butyryl chloride, isobutyryl chloride, n-valeryl chloride n-caproyl chloride, n-palmitoyl chloride and n-stearoyl chloride. Also, aromatic acyl halides such as benzoyl chloride may be used. Further, polyacyl halides formed from aromatic acids, such as pyromellitic acid and trimellitic acid, and from aliphatic acids, such as sebacic acid, azelaic acid, etc., or partial esters thereof can also be used. While the halide radical can be supplied by any of the halogens having an atomic number of 9 to 53, the chlorides and bromides are most often preferred. The molar ratio of polymerized olefinically-unsaturated monomer to acyl halide residue in the polymer may be about 1 or less to 300:1, preferably about 1 to 50:1. Thus, the polymer may have about 1 to 300, preferably about 1 to 50, molar equivalents of olefinically-unsaturated monomer per gram atom of ketonic oxygen in the polymer.

The polymeric ketone used as an intermediate in the preparation of the novel condensation reaction products of the present invention can be prepared by subjecting the alpha-olefin and the dissimilar monomer if used, to a polymerization temperature of about 0° to 50° C., preferably about 0° to 25° C., in the presence of the aforementioned acyl halide and a strong Friedel-Crafts catalyst such as aluminum trichloride or boron trifluoride $AlCl_3$ is a preferred catalyst. The acyl halide e.g., acetyl chloride, can be charged with the Friedel-Crafts catalyst in an amount sufficient to form the keto derivative of the polymer. It is preferred to add the dissimilar monomer, if used, along with the α-olefin, as well as to add the catalyst solution and monomer feed separately and simultaneously to the reaction vessel. A monochloroalkane solvent for the catalyst and the acyl halide is employed in the polymerization reaction, the solvent also functioning as a co-catalyst for the reaction. The monochloroalkane has 1 to 4 carbon atoms, ethyl chloride often being preferred.

The strong Friedel-Crafts cataysts may be present in the co-catalyst solution in a concentration of about 0.1 to 15%, preferably about 0.5 to 7% by weight, and the amount of the Friedel-Crafts catalyst employed may be about 0.1 to 20%, preferably about 2 to 15% by weight of the monomer fed. The acyl halide may often be present in the catalyst solution in a concentration of from about 0.002 to 0.1 mole per 100 ml. of catalyst solution. The acyl halide concentration will usually not exceed, on a molar basis, that of the Friedel-Crafts catalyst, with the molar ratio of acyl halide to Friedel-Crafts catalyst often being in the range of about 0.1 to 1:1. The volumetric ratio of catalyst solution to the olefinic reactants used may be about 0.5 to 5:1, preferably about 2 to 3:1.

After combination of the catalyst and reactants, the polymerizaton may be permitted to continue, for instance, for about 5 to 45 minutes, to insure polymerization of the monomer to a base oil-soluble polymer product. The polymer may be a normally liquid material having a kinematic viscosity at 210° F., of, say, from about 25 to 600 centistokes, preferably about 30 to 300 centistokes, which viscosity ranges will correspond, generally, to polymers having molecular weights in the range of about 300 to 10,000 or more, often about 1,000 to 5,000. The polymeric ketone will normally be unsaturated but need not be. Thus, for example, if there is additionally present during the polymerization another chain-terminating, i.e., monofunctional, material the resulting product may often be devoid of any, or have less, ethylenic unsaturation. The polymerization reaction can be quenched using, for instance, water or a lower alkanol, e.g., of 1 to 4 carbon atoms, in solution in a lower alkane. The resulting polymer can be separated from residual catalyst by washing with water, alcohol, dilute aqueous caustic soda hydrochloric acid or other suitable hydrolyzing and washing methods.

The novel ashless detergent of the present invention can be prepared by the condensation reaction of the polymeric ketone described above with an essentially aliphatic polyamine. Suitable polyamines may be represented by the general formula:

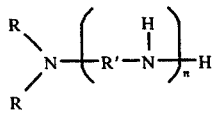

wherein R' is a divalent alkylene radical of 2 to 14 or more carbon atoms, preferably 2 to about 7 carbon atoms; R is selected from hydrogen and hydrocarbon radicals such as alkyl, including cycloalkyl, which may have, for instance 1 to about 30 or more carbon atoms, preferably 1 to about 7 carbon atoms; $n$ is a number from 1 to about 10, preferably about 2 to 6. R may extend between the two N-atoms, for instance the two to which R' is attached, in which case these nitrogen atoms will have only one other bond for further attachment. The R and R' substituents are preferably saturated, but may be unsaturated, and may be substituted with non-deleterious substituents. Polymers from the reaction of alkylene dihalides with ammonia or from the polymerization of ethylene imine are often preferred. In addition other groups present such halogen, carboxy, or ester, can react with the amine, such as when the monoethyl ester of suberoyl chloride is used as the acyl halide.

The formation of a Schiff base may occur in the condensation reaction of the polymeric ketone with the polyamine. For this formation a 1,2-diamine, at least one amine group of which is primary, can be used; suitable amines include those represented by the following general formula:

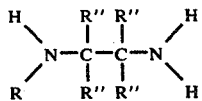

wherein R is selected from hydrogen and hydrocarbon radicals such as alkyl, as noted above, or is amino alkyl of 1 to about 30, preferably 1 to about 7 carbon atoms, and R'' is selected from H and alkyl of 1 to about 12 or more carbon atoms, preferably 1 to about 5 carbon atoms. R may also be a hydroxy-alkyl, alkoxy-alkyl or aromatic radical.

Thus, useful polyamines include, for instance, monoalkylenediamines, dialkylaminoalkylamines, polyalkylenepolyamines, N-(p-aminoalkyl)piperazines etc. Illustrative of suitable monoalkylene diamines are ethylene diamine, propylene diamine, butylene diamine, octylene diamine, etc. Examples of suitable dialkylaminoalkylamines are dimethylaminoethylamine, dimethylaminopropylamine, dimethylaminobutylamine, diethylaminopropylamine, diethylaminoamylamine, dipropylaminopropylamine, methylpropylaminomylamine, propylbutylaminoethylamine, etc. Examples of polyalkylenepolyamines are diethylenetriamine, triethylenetetramine, tetraethylenepentamine, hexapropyleneheptamine, tetrabutylene pentamine, polyamine D (a mixture of aliphatic and cyclic polyethyleneamines boiling above 340° C. and having an average molecular weight nearly the same as pentaethylenehexamine and having as principal components pentaethylene hexamine, symmetrical and unsymmetrical diaminoethyl triaminoethylamine, symmetrical diaminoethyl triethylenetetramine, symmetrical and unsymmetrical diaminoethyl, diaminoethyl piperazine, piperazinoethyl triethylenetetramine, 4-(N-piperazinoethyl) triethylenetetraamine, bis-piperazinoethylamine, and aminoethyl(dipiperazinoethane)) polyamine H (bottoms from manufacturing tetraethylene pentamine) etc. Suitable N-($\beta$-aminoalkyl) piperazines include N-methyl-N'-($\beta$-aminoethyl) piperazine, N-($\beta$-aminoisopropyl) piperazine, etc.

In the condensation reaction of the polymeric ketone with the organic polyamine to prepare the detergent of the invention, the polyamine is generally reacted in an amount sufficient to provide up to about 1 mole of polyamine and at least about 0.1 gram atom of primary amino nitrogen, per each gram atom of ketonic oxygen in the polymeric ketone and for each additional reactive group; e.g. acid or ester. By "primary amino nitrogen" is meant nitrogen of a primary amine group of the polyamine. Preferably, the amount of polyamine will be sufficient to provide at least about 1 gram atom of primary amino nitrogen for each gram atom of ketonic oxygen.

The reaction may be conducted at elevated temperatures of about 60° to 320° C. Often, the reaction takes about 0.25 to 24 hours, more often about 0.5 to 5 hours; the product is normally liquid, is soluble in the base oil, and may have a kinematic viscosity at 100° F. of, for example, about 1000 to 6000, preferably about 2000 to 3000, centistokes, and a kinematic viscosity at 210° F. of, for example, about 50 to 1500, preferably about 100 to 800, centistokes The condensation reaction product is added to the lubricating oil in minor amounts, effective to impart detergency to the oil, for instance about 0.1 to 10% or more, preferably about 0.25 to 7.5%, by weight of the oil.

Lubricating oils which can be used as the base oil or major component of the lubricating oil compositions of the present invention include a wide variety of oils of lubricating viscosity, such as naphthenic base, paraffinic base, and mixed base mineral lubricating oils; other hydrocarbon lubricants e.g., lubricating oils derived from coal products; and synthetic oils, e.g. alkylene polymers (such as polymers of propylene, butylene, etc., and mixtures thereof), alkylene oxide type polymers (e.g., alkylene oxide polymers prepared by polymerizing the alkylene oxide, e.g., propylene oxide, etc., in the presence of water or alcohols, e.g., ethylene alcohol), carboxylic acid esters (e.g., those which are prepared by esterifying such dicarboxylic acis as adipic acid, agelic acid, suberic acid, sebacic acid, alkyl succinic acid, fumaric acid, maleic acid, etc. with alcohols, such as butyl alcohol. hexyl alcohol, 2-ethylhexyl alcohol, dodecyl alcohol, etc.). The synthetic oils to which the polymeric reaction products may be added include ester-based synthetic oils of lubricating viscosity which consist essentially of carbon, hydrogen and oxygen, e.g. di-2-ethylhexyl sebecate. The above base oils may be used individually or in combinations thereof, wherever miscible or wherever made so by the use of mutual solvents Various of these lubricating materials have been described in the literature and generally their viscosity ranges from the light to heavy oils, e.g. about 50 SUS at 100° F. to 250 SUS at 210° F. and preferably about 30 to 150 SUS at 210° F.

Materials normally incorporated in lubricating oils to impart special characteristics can be added to the composition of this invention. These include corrosion inhibitors, extreme pressure agents, anti-wear agents, etc. The amount of such additives included in the composition usually ranges from about 0.01 weight percent up to about 20 or more weight percent, and in general they can be employed in any amounts desired as long as the composition is not unduly deleteriously affected.

The following Examples are included to further illustrate the present invention.

EXAMPLE I

To a mixture of alpha-olefins of the following approximate composition:

| Component | Wt.% |
|---|---|
| Total Olefins | 95+ |
| Total α-Olefins | 94 |
| Straight Chain α-Olefins 86 | |
| Branched and Naphthenic Olefins | 3 |
| Straight Chainα, ω-Di-Olefins | 6 |
| Saturated and Aromatic Hydrocarbons | 4 |
| Molecular Weight Distribution, | |

| No. of Carbon Atoms | Wt.% |
|---|---|
| 14 | 1 |
| 15 | 12 |
| 16 | 19 |
| 17 | 18 |
| 18 | 18 |
| 19 | 17 |
| 20 | 14 |
| 21 | 1 | was added styrene in a mole ratio of alpha-olefin to styrene of 2.04 to 1, based on the average molecular weight (243) of the alpha-olefin mixture. A one-liter flask was equipped with a Dean Stark Trap and two additional funnels. A Dry Ice trap was mounted on the Dean Stark trap to remove and condense the volatile solvent, ethyl chloride, used in the polymerization. One funnel was charged with the olefin-styrene feed, and to the remaining funnel was charged a catalyst solution consisting of ethyl chloride having dissolved in each 100 ml. thereof at 12° C., 5.15 grams of aluminum chloride and 0.0196 moles of acetyl chloride.

Both the olefin-styrene feed and the catalyst solution were introduced into the reaction flask simultaneously, the olefin-styrene mixture at a rate of 17.7 ml. per minute (0.0496 mole per minute alpha-olefin, 0.0243 mole per minute styrene), and the catalyst solution containing acetyl chloride at a rate of 37.3 ml. per minute (0.0144 mole per minute aluminum chloride, 0.00731 mole per minute acetyl chloride). The total time for the addition of olefin-styrene and catalyst solution was 13 minutes and the polymerization mixture was stirred for an additional 15 minutes. The temperature during the polymerization was 15° C. and 245 ml., 50.5%, of ethyl chloride was trapped out of the polymerization system. Hexane, 400 ml., and 400 ml. of isopropanol were added to quench the catalyst.

The resulting polymer was washed with dilute hydrochloric acid and washed three additional times with water. The polymer, when stripped of solvents, had a KV at 210° F. of 60.99 cs., KV at 100° F. of 742.9 cs., specific gravity of 0.884, oxygen content of 0.98%, and an iodine number of 16.5. Infrared detected ketone formation but no aromatic ketone group; therefore, only an aliphatic ketone group was present. From the infrared spectrum it was also determined that the styrene had copolymerized since no evidence of polystyrene was found.

To a 500 ml. reaction flask was charged 100 grams of the above polymer and 10 grams of tetraethylenepentamine. The system was purged with nitrogen over a 10 minute period as the temperature was increased to 100° C. The temperature was further elevated to 270° C. over a 10-minute period and an 18 cm. vacuum was applied at 270° C. for a period of one hour and five minutes to facilitate the removal of water. The temperature was allowed to reach room temperature under this reduced pressure. The resulting product, when washed with water and stripped of solvents, exhibited a specific gravity of 0.8971, KV at 100° F. of 2924 cs; KV at 210° F. of 160.35 cs; iodine number of 18.8 and 1.09% nitrogen. Infrared detected the C=N bond and confirmed the formation of a Schiffs base reaction product. The polymer was tested as an ashless detergent in a 95 V.I. Mid-Continent neutral oil in the Low Temperature Detergency Bench Test described in U.S. Pat No. 3,044,860.

The following results were obtained:

TABLE I

| | Merit Rating (100 = Clean) |
|---|---|
| Base Oil | 22 |
| Base Oil Plus 2% Additive | 62 |

EXAMPLE II

The same polymerization equipment was used as in Example 1. One funnel was charged with an olefin feed of approximate composition:

| | |
|---|---|
| 1% C$_8$ alpha-olefin | 21% C$_{11}$ alpha-olefin |
| 22% C$_9$ alpha-olefin | 1% C$_{12}$ alpha-olefin |
| 55% C$_{10}$ alpha-olefin | | and to the remaining funnel was charged a catalyst solution consisting of 5.15 grams aluminum chloride per 10 ml. of a solution of ethyl chloride containing 0.0206 moles of acetyl chloride. The acetyl chloride was added directly to the catalyst solution. The catalyst solution was at 12° C., the boiling point of ethyl chloride.

Both the olefin feed and catalyst solution containing acetyl chloride were introduced into the reaction flask simultaneously, the olefin mixture at a rate of 21.7 ml. per minute (0.1160 mole per minute C$_8$ to C$_{12}$ alpha-olefin), the catalyst solution containing acetyl chloride at a rate of 43.6 ml. per minute (0.0169 mole per minute aluminum chloride, 0.0090 mole per minute acetyl chloride). The total time for addition was 11 minutes and the polymerization mixture was stirred for an additional 14 minutes. The temperature during polymerization was 20.5° C. and 320 ml. of ethyl chloride, 66.5%, was trapped out of the polymerization system. Hexane, 400 ml., and 400 ml. of isopropanol were added to quench the catalyst. The polymer was washed with water and stripped of solvents. The polymer had the following properties:

| | |
|---|---|
| KV at 100° F. | 3749.7 cs. |
| KV at 210° F. | 241.17 cs. |
| Iodine Number | 40.6 |
| Specific Gravity | 0.8687 |
| % Oxygen | 1.18 |

The infrared spectrum indicated the product to be a high molecular weight alkyl methyl ketone.

To a 500 ml. flask is charged 100 grams of the polymeric ketone and 10 grams of tetraethylene pentamine. The temperature is increased to 100° C. over a 10-minute period during which the reaction flask is being purged with nitrogen. The temperature is then increased to 210° C. over a 10-minute period and water vapor appears in the reaction vessel. An 18 cm. vacuum is applied at 210° C. for an additional 65 minutes to facilitate the removal of water. The reaction is allowed to reach room temperature under this reduced vacuum. The polymer is washed with water and stripped of solvents. The polymer is tested as an ashless detergent in a 95 V.I. Mid-Continent neutral oil in the Low Temperature Detergency Bench Test as described in U.S. Pat. No. 3,044,860.

The following results are obtained:

TABLE II

|  | Merit Rating (100 = Clean) |
| --- | --- |
| Base Oil | 22 |
| Base Oil Plus 2% Additive | 68 |

It is claimed:

1. A mineral oil-soluble condensation reaction product of (A) a mineral oil-soluble polymeric ketone having a molecular weight of from about 1,000 to 5,000 said polymeric ketone being prepared by the polymerization of a major portion of an α-monoalkene having from 3 to about 30 carbon atoms and mixtures thereof and a minor portion of another olefinically unsaturated copolymerizable monomer having from about 3 to about 25 carbon atoms said polymerization being initiated by the use of an acyl halide strong Friedel Crafts catalyst complex wherein the acyl portion of the acyl halide has from 2 to about 10 carbon atoms and is selected from the group consisting of the corresponding acid halides of saturated aliphatic acids and the corresponding acid halide of unsubstituted aromatic acids; and (B) a polyamine having the formula:

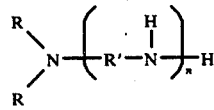

wherein R' is a divalent alkylene radical of 2 to about 14 carbon atoms, R is selected from hydrogen and hydrocarbon radical of 1 to about 30 carbon atoms and n is 1 to about 10; the amounts of (A) and (B) in said product being sufficient to provide up to about 1 mole of (B) and at least about 0.1 gram atom of primary amine nitrogen, per gram atom of ketonic oxygen in (A), said condensation reaction products being soluble in mineral lubricating oil and said reactions being conducted at a temperature and for a time sufficient to form said reaction products.

2. A product of claim 1 wherein the acyl halide is selected from an alkanoyl chloride or bromide.

3. A product of claim 1 wherein the α-monoalkene has from about 9 to 21 carbon atoms.

4. A product of claim 2 wherein the α-monoalkene has from about 9 to 21 carbon atoms.

5. A product of claim 4 wherein the Friedel-Crafts catalyst is aluminum chloride.

6. A product of claim 1 wherein the α-monoalkene and dissimilar monomer are polymerized in a reaction zone at a temperature of about 0° to 50° C. with a catalyst solution comprising about 0.5 to 15% by weight of the solution of the total Friedel-Crafts catalyst, about 0.002 and 0.1 mole of acyl halide per each 100 ml. of the solution and an essential balance of a monochloroalkane solvent of 1 to 4 carbon atoms.

7. A product of claim 4 wherein the α-monoalkene and dissimilar monomer are polymerized in a reaction zone at a temperature of about 0° to 50° C. with a catalyst solution comprising about 0.5 to 15% by weight of the solution of the total Friedel-Crafts catalyst, about 0.002 to 0.1 mole of alkanoyl halide per each 100 ml. of the solution and an essential balance of a monochloroalkane solvent of 1 to 4 carbon atoms.

8. A product of claim 7 wheren the Friedel-Crafts catalyst is aluminum chloride and the monochloroalkane solvent is ethyl chloride.

9. A product of claim 1 wherein R' in the polyamine is a divalent alkaline radical of 2 to 7 carbon atoms, R is selected from hydrogen and alkyl of 1 to 7 carbon atoms, and n is about 2 to 6.

10. A product of claim 3 wherein R' in the polyamine is a divalent alkaline radical of 2 to about 7 carbon atoms, R is selected from hydrogen and alkyl of 1 to 7 carbon atoms, and n is about 2 to 6.

11. A product of claim 4 wherein R' in the polyamine is a divalent alkaline radical of 2 to 7 carbon atoms, R is selected from hydrogen and alkyl of 1 to 7 carbon atoms, and n is about 2 to 6.

12. A product of claim 7 wherein R' in the polyamine is a divalent alkaline radical of 2 to about 7 carbon atoms, R is selected from hydrogen and alkyl of 1 to 7 carbon atoms, and n is about 2 to 6.

13. A product of claim 9 wherein R' contains 2 carbon atoms and R is hydrogen.

14. A product of claim 11 wherein R' contains 2 carbon atoms and R is hydrogen.

15. A product of claim 12 wherein R' contains 2 carbon atoms and R is hydrogen.

* * * * *